(No Model.)
E. THOMSON.
ALTERNATING CURRENT REGULATOR.
No. 382,336. Patented May 8, 1888.
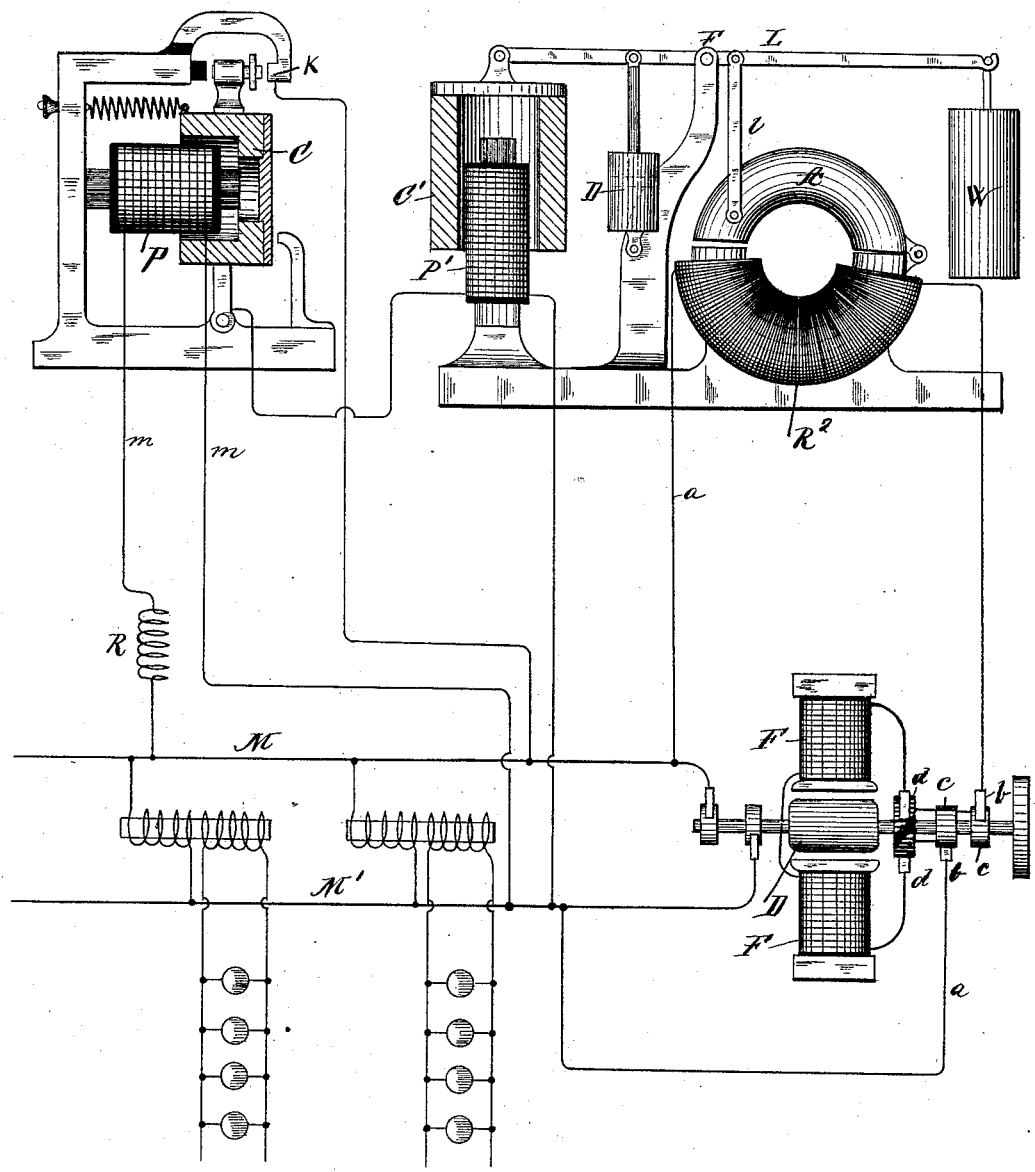

UNITED STATES PATENT OFFICE.

ELIHU THOMSON, OF LYNN, MASSACHUSETTS.

ALTERNATING-CURRENT REGULATOR.

SPECIFICATION forming part of Letters Patent No. 382,336, dated May 8, 1888.

Application filed March 30, 1887. Serial No. 232,941. (No model.)

*To all whom it may concern:*

Be it known that I, ELIHU THOMSON, a citizen of the United States, and a resident of Lynn, in the county of Essex and State of Massachusetts, have invented certain new and useful Alternating-Current Regulators, of which the following is a specification.

The object of my invention is to provide a means whereby the flow of alternating currents in an electric circuit or portion of a circuit may be automatically regulated.

To this end my invention consists in the novel combinations of devices and apparatus hereinafter described and claimed.

I have herein shown the invention as applied to regulating the flow of alternating currents to the field-magnet of an alternating-current generator whose field is maintained by alternating currents derived from the main and passed through a suitable commutator on the shaft of the machine.

The invention is, however, applicable to any situation or condition where it is desired to control the strength of an alternating current automatically.

Referring to the drawing, which is a diagram illustrating my invention, M M' indicate conductors which are connected in any suitable manner with the armature D of an alternating-current generator of any desired construction.

F F' are the field-magnets of said generator, which are supplied with current taken from the mains M M' through wires $a\ a$, leading to brushes $b\ b$, which bear upon rings $c\ c$, insulated from one another and carried by the armature-shaft in any desired manner. The rings $c\ c$ connect, respectively, with the segments $d\ d$ of a two-part commutator, upon which bear the brushes connected to the field-magnet coils F. The number of divisions of the commutator will depend upon the number of alternations of currents which are produced by the armature D in a single revolution.

The action of the commutator is simply to straighten the alternating currents coming over the branch $a\ a$, so that they will flow as a continuous current in the coils F. This arrangement forms the subject of a prior application for patent filed by me.

The mains M M', which supply induction-coils or other devices in multiple arc or otherwise, are connected by branch wires $m\ m$ with the coils of an electro-magnet, P, in circuit with which is included an artificial resistance, R, adapted to prevent the diversion of any but a small amount of current from the mains.

The electro-magnet P is the prime controller device for a reactive coil, $R^2$, whose convolutions of wire are included in the branch $a$, and which opposes a counter electro-motive force to the flow of the alternating currents to a degree dependent upon the magnetic closure of the circuit for the core upon which said coils are wound. This variation of effect in the reactive coil is secured by means of the armature A, one or both ends of which may be moved to or from the ends of the core upon which the coils $R^2$ are wound to vary the closure of the magnetic circuit.

As the armature A approaches the core to close the magnetic circuit, the reaction is greatly increased. The armature A is conveniently pivoted at one end, and its other end is moved by means of a link, $k$, connected to a lever, L, which is pivoted at F, and is provided with a counterpoise weight or spring, indicated at W. The lever L is moved by any mechanism which is under the control of the electro-magnet P. Suitable devices for securing such a movement in obedience to variations in the strength of the alternating currents in the circuit $m\ m$ are as follows:

Embracing the core or coil of magnet P and in suitable inductive proximity thereto is a closed ring of copper, C, or other good conducting material, in which rapid alternations of current may be induced by the inductive action of coil P or its core. The conducting-ring C is of such good conductivity that the induced currents in it will be of high self-induction and will tend to prolong themselves each beyond the period of the inducing-current which sets it up and until the succeeding reversed current in the coil P begins freely to flow. The effect, when the self-induction of C is made sufficient, will be a continuous repulsion of C away from the core or coil P. This will be variable in amount with the strength of the inducing-currents, and is normally opposed by the operation of a suitable spring or retractor acting on the movable support for the conductor C.

The movements of the conductor C may be made to control electrically or mechanically the operation of the lever L, after the manner employed in various regulating apparatus used with dynamo-machines and other electrical devices.

I prefer to employ an electrical means, and for this purpose I make the movements of the conductor C put into and out of circuit a second coil, P', which may carry either an alternating or continuous current for acting upon an armature or other device carried by the lever L.

In the present instance I have shown the coil P' as connected to a branch from the mains M M, which branch is controlled by a contact-stop at K, forming the back contact for the movable support of the conductor C.

The obvious effect is that when the conductor C is sufficiently repelled to close the contact at K alternating currents will be caused to flow in the coil P'. These alternating currents produce movement of the lever L by means of the conducting ring or cylinder C', which is similar to C, and is repelled by P' whenever the coils of the latter are included in the alternating-current branch governed by C. It is to be understood that the weight of C' is ordinarily sufficient to overcome the weight W and the armature A. A dash-pot, D, is provided to prevent sudden movements or vibrations of the lever L.

The operation of the device will be obvious from the foregoing description.

If from any cause there should be an increase in the difference of potential of the mains, more current would flow on the branch $m\ m$, thus bringing into action the devices which will cause the armature A to close to a greater extent the magnetic circuit of the reactive coil and increase the reaction of the latter, so as to cut down the current on $a$ to normal, or decrease the same, if necessary, so as to decrease the capacity of the generator in obvious manner and keep the potential on the mains constant.

I have shown one form of motor device that may be used for moving the device, whereby the counter electro-motive force of the reactive coil is adjusted; but I do not limit myself to the special device described, since other motor devices, either electrical or mechanical, might be used in its place, after the manner employed with regulating apparatus applied to dynamo-machines or to adjustable resistance or other appliances for regulating the flow of an electric current.

Though I prefer to use the adjustable armature A, I may employ any other means for adjusting the effect of the reactive coil when such coil is combined with the field-magnet of an alternating-current generator and has its counter electro-motive force governed by a controller device, such as P C, responsive to variations of electrical condition on the circuit supplied from the machine.

In order that the heating of coil P and the attendant change of resistance in it may not have any appreciable disturbing effect, I construct the artificial resistance R so that on normal action it shall heat, say, to 300° or more, and I make such resistance the bulk of the resistance in the branch in which the coils of the electro-magnet P are placed.

The coil R may be constructed in any suitable manner, so that there shall be free access of air to it; but it should be shielded from drafts, which would tend to produce sudden variations in its temperature, and consequently in its resistance.

When the apparatus is started, the resistance R heats quickly and acquires a definite resistance, which is so large that the changes of resistance in coil P by heating do not appreciably affect the amount of current passing.

Incandescent lamps or German-silver coils on an open frame may be used for the resistance R. This device is useful in connection with any controlling-circuit employed for regulating differences of potential.

What I claim as my invention is—

1. The combination, with a reactive coil having means whereby the closure of its magnetic circuit may be varied, of a controlling mechanism responsive to variations in the strength of an alternating current.

2. The combination, with a reactive coil placed in an alternating-current circuit, of an adjustable armature, and a controlling device consisting of a coil in which alternating currents flow, and a closed circuit-conductor in which induced currents of high self-induction are set up by the alternating currents, as and for the purpose described.

3. The combination, with a device in which a repulsive action is set up by the operation of alternating currents, as described, of a motor mechanism controlled thereby, and a reactive coil having means operated by said motor mechanism whereby its magnetic circuit may be variably closed.

4. The combination, with an alternating-current dynamo, of an adjustable reactive coil in an alternating-current circuit, and controlling devices for governing the counter electro-motive force of the reactive coil, said controlling devices being connected with and responsive to variations of electrical condition in the alternating circuit supplied from the dynamo.

5. The combination, substantially as described, of a reactive coil in an alternating-current circuit, a movable armature, and an actuating device consisting of a coil having connections to an alternating-current source, and a conductor in which currents of high self-induction are set up to produce the repulsive action, as described, that shall operate upon the movable armature.

6. The combination, with an alternating-current dynamo, of a field-coil connected to the armature of said dynamo, a reactive coil in the connection to the field-coil having means whereby its counter electro-motive force may be governed, a motor mechanism for operating the adjusting device, and a controller electro-magnet, P, connected to the alternating-current circuit of the dynamo.

7. The combination, with an alternating-current dynamo, of a field-magnet coil connected to the armature, a commutator in said connection, a reactive coil having an adjustable armature for varying the counter electro-motive force in said connection, and a motor-magnet and controller-magnet connected to the alternating-current main and governing the connection of said motor-magnet with said main.

8. The combination, with an alternating-current branch or circuit, $a$, of a reactive coil having means whereby its counter electro-motive force may be adjusted, a motor mechanism for effecting an adjustment, and a controlling device in which a variable repulsive effect is set up by the action of alternating currents derived from the source supplying the circuit of branch $a$.

9. The combination, with a reactive coil in an alternating circuit or branch, of means for varying the magnetic closure of the magnetic circuit or core on which said coil is wound.

10. The combination, with a circuit or portion of circuit, $m$, and a magnet-coil in said circuit, of an artificial resistance whose amount is large compared with that of the coil, and which is of proper character, as described, to have an approximately constant resistance, as described, while the resistance of the coil varies.

Signed at Lynn, in the county of Essex and State of Massachusetts, this 24th day of March, A. D. 1887.

ELIHU THOMSON.

Witnesses:
E. WILBUR RICE, Jr.,
J. W. GIBBONEY.